United States Patent
Glover et al.

(10) Patent No.: US 9,766,491 B2
(45) Date of Patent: Sep. 19, 2017

(54) SYSTEM AND METHOD FOR LCD ASSEMBLY HAVING INTEGRATED COLOR SHIFT CORRECTION

(75) Inventors: David R. Glover, Ann Arbor, MI (US); Ching Fong, Ann Arbor, MI (US); Joseph A. Pasek, Northville, MI (US); Michael R. Boyd, Saline, MI (US); Wesley R. Corrion, Linden, MI (US)

(73) Assignee: Yazaki North America, Inc., Canton, MI (US)

( * ) Notice: Subject to any disclaimer, the term of this patent is extended or adjusted under 35 U.S.C. 154(b) by 301 days.

(21) Appl. No.: 13/604,144

(22) Filed: Sep. 5, 2012

(65) Prior Publication Data

US 2014/0063417 A1 Mar. 6, 2014

(51) Int. Cl.
*G02F 1/1335* (2006.01)

(52) U.S. Cl.
CPC ...... *G02F 1/133514* (2013.01); *G02F 1/1336* (2013.01); *G02F 2001/133562* (2013.01); *G02F 2001/133624* (2013.01); *Y10T 29/49002* (2015.01)

(58) Field of Classification Search
CPC ... G02F 1/133514; G02F 2001/133624; G02F 2001/133562; G02F 1/1336
See application file for complete search history.

(56) References Cited

U.S. PATENT DOCUMENTS

| | | | |
|---|---|---|---|
| 7,463,321 B2 | 12/2008 | Song et al. | |
| 7,619,726 B2 | 11/2009 | Wang et al. | |
| 7,696,741 B2 | 4/2010 | Gurr | |
| 8,054,428 B2 | 11/2011 | Song et al. | |
| 2004/0008208 A1* | 1/2004 | Dresevic et al. | 345/589 |
| 2005/0280850 A1 | 12/2005 | Kim et al. | |
| 2006/0012808 A1 | 1/2006 | Mizukura et al. | |
| 2007/0139957 A1 | 6/2007 | Haim et al. | |
| 2007/0237918 A1* | 10/2007 | Jonza et al. | 428/43 |
| 2008/0259478 A1* | 10/2008 | Seo et al. | 359/885 |
| 2010/0103355 A1* | 4/2010 | Sakamoto et al. | 349/106 |
| 2010/0296033 A1* | 11/2010 | Maeda et al. | 349/106 |
| 2011/0050737 A1 | 3/2011 | Yu et al. | |
| 2011/0069511 A1 | 3/2011 | Chen et al. | |
| 2011/0102704 A1 | 5/2011 | Dunn et al. | |
| 2012/0069274 A1 | 3/2012 | Wang et al. | |

FOREIGN PATENT DOCUMENTS

EP 2242119 A1 10/2010
JP 2011-221376 11/2011

* cited by examiner

*Primary Examiner* — Jessica M Merlin
(74) *Attorney, Agent, or Firm* — Foley & Lardner LLP

(57) ABSTRACT

A system is disclosed for correcting a color of light being generated by an LCD image system having an LED and an LCD glass component that is illuminated by the LED. A plurality of color correction filters are constructed, with each providing a predetermined, differing color shift to light being output by the LCD glass component, based on a measured color of the light being output from the LCD glass component. Each of the color correction filters is constructed based on a known range of color variations that may be present in a color of the light being output from the LCD glass component. Each filter provides a color shift that shifts the color of the light being output from the LCD glass component from outside a predetermined target color area back into the predetermined target color area.

5 Claims, 4 Drawing Sheets

SYSTEM AND METHOD FOR LCD ASSEMBLY HAVING INTEGRATED COLOR SHIFT CORRECTION

FIELD

The present disclosure relates to liquid crystal display (LCD) assemblies, and more particularly to an LCD assembly that incorporates a selected one of a plurality of different color shift correction filters to compensate for a determined color shift in the light output of the LCD assembly.

BACKGROUND

The statements in this section merely provide background information related to the present disclosure and may not constitute prior art.

Liquid Crystal Display (LCD) assemblies are becoming more and more common in a wide variety of products, and especially in motor vehicles such as cars and trucks. Such displays are now in widespread use in vehicle instrument panels.

In automotive and other applications, a manufacturer may wish to maintain the color of light emitted from an LCD display to within a predetermined color range or variance. For example, the manufacturer may determine that a certain shade of blue is particularly easy to see, and produces less eye strain, under a wide variety of lighting conditions that might be expected to occur inside a motor vehicle throughout the day and evening. So the manufacturer may wish that all the LCD image systems used in the instrument panels for a particular model vehicle produce a consistent color output that falls within a small color range or "window". However, this can be challenging because variations in the construction of the LCD image systems can often cause an unacceptable deviation from the desired color range. The precise color produced by an LCD image system can vary because of small manufacturing variations in several components that are typically used in such a system, or possibly because of variations in voltage and/or currents used to operate the LCD image system. Such variation may be caused by the LCD display itself, by a light guide that is typically used in such an LCD image system, by a diffuser, or even by an LED light source used with the system. In most instances, however, it is believed that the LCD display will be the component that is predominantly responsible for producing the majority of the color shift in the output of an LCD display system, with the LED itself typically being responsible for the remaining degree of color shift. The color shifts caused by the diffuser and light guide typically are negligible.

Adding to the difficulty in compensating for the color shift produced by the LCD display is that the color shift is not consistent between LCD assemblies due to component variation; in other words the color shift has a certain tolerance along both the Cx and the Cy axes of a chromaticity graph, when plotting the variation in color output of an LCD image system on a chromaticity graph. This tolerance range significantly enlarges the area of the possible color that the output from an LCD display may take. FIG. 1 illustrates this variation. FIG. 1 shows a desired or "target" color range of an LCD image system, as defined by the square corners of line A in the chromaticity graph. In this example the target color range is a true white color, but it will be appreciated that the target color could be any selected color. The diamond shaped corners of the polygon represented by line B define the area of possible color that may be produced by a Nichia NSSW157AT, color bin b5, LED. Line C represents the "uncompensated color space", or in other words the total area of potential color variation that may be expected from an LCD image system as a result of the range of Cx,Cy variations in color shift caused by both the manufacturing variations in the LCD display and the variations in the color output of an LED used as the light source of the LCD image system. In this example the LCD display color shift may be Cx=0.025+/−0.015, and Cy=0.05+/−0.015. So $dx_{min}$=0.01; $dx_{max}$=0.04; and $dy_{min}$=0.035 and $dy_{max}$=0.065. These figures produce the corners of the uncompensated color space defined by Line C.

A challenge, then, is to determine what degree/direction of color shift is needed, for each specific LCD image system, and to somehow implement that needed degree/direction of color shifting to bring the final light output of the LCD image system back within the desired color range (e.g., the color defined by line A in FIG. 1).

SUMMARY

In one aspect the present disclosure relates to a system for correcting a color of light being generated by an LCD image system having an LED and an LCD glass component that is illuminated by the LED. The system may include a plurality of color filters each constructed to provide a predetermined, differing color shift to light being output by the LCD glass component. Each one of the color filters may further be adapted to be placed adjacent the LCD glass component of the image. The plurality of color filters may be constructed based on a known range of color variations that may be present in a color of the light being output from the LCD glass component, and further to provide a color shift that shifts the color of the light being output from the LCD glass component from outside a predetermined target color area back into the predetermined target color area.

In another aspect the present disclosure relates to a LCD system for correcting a color of light being emitted therefrom. The system may comprise a LED and an LCD glass component that is illuminated by the LED. A plurality of color correction filters may be included, with each being constructed to provide a predetermined, differing color shift to light being output by the LCD glass component. The color correction filters all further may be of dimensions that enable a selected one of the color correction filters to be placed adjacent the LCD glass component during assembly of the LCD system. The plurality of color correction filters may also be constructed based on a known range of color variations that may be present in a color of the light being output from the LCD glass component, and further constructed such that a selected one of the color correction filters provides a color shift that shifts the color of the light being output from the LCD glass component, from outside a predetermined target color area, back into the predetermined target color area.

In still another aspect the present disclosure relates to a method for correcting a color of light being generated by an LCD image system having an LED and an LCD glass component that is illuminated by the LED. The method may include constructing a plurality of color correction filters each adapted to provide a predetermined, differing color shift to light being output by the LCD glass component. Each one of the color correction filters may further be constructed to enable it to be placed within the optical path between the LED and the viewers eye; typically adjacent the LCD glass component or adjacent the LED component. The plurality of color correction filters may also be constructed based on a known range of color variations that may be present in a color of the light being output from the LCD glass component, and further to provide a color shift that shifts the color of the light being output from the LCD glass component from outside a predetermined target color area back into the predetermined target color area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
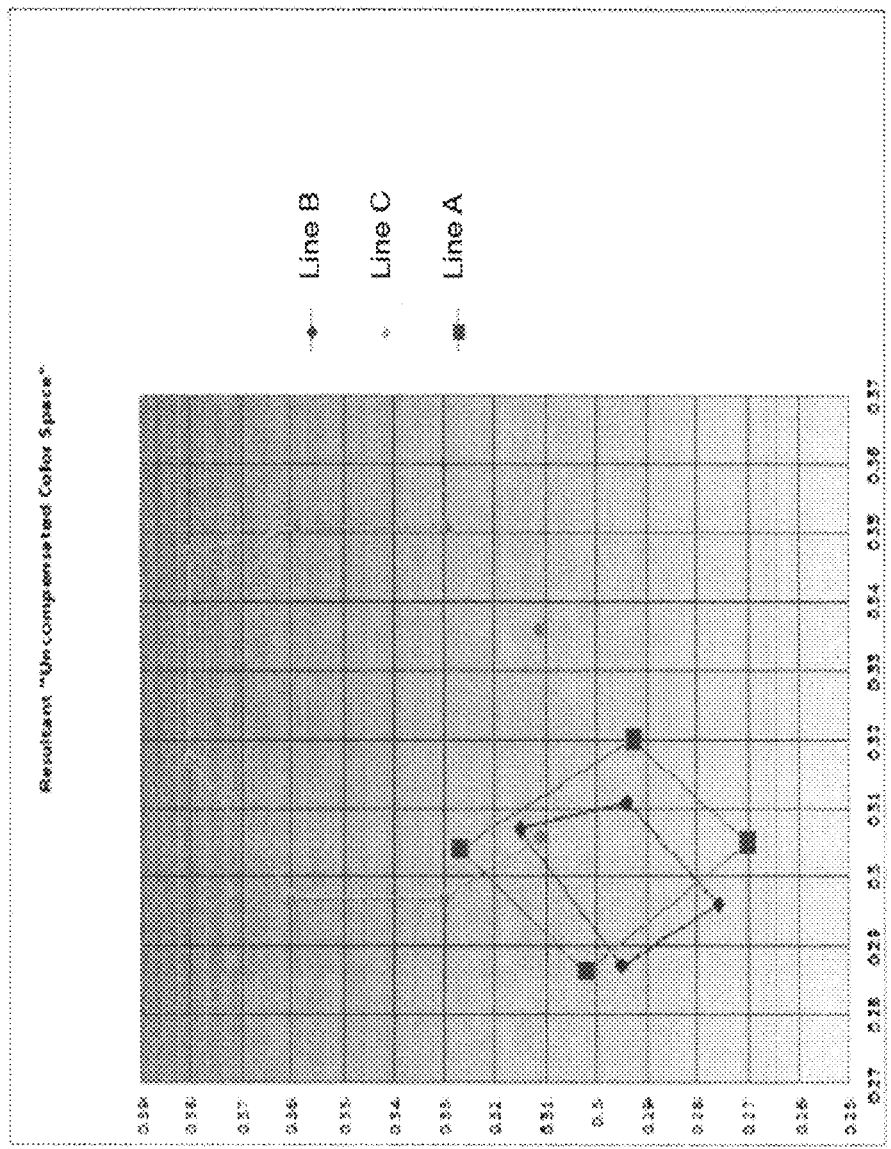
FIG. 1 is a chromaticity graph illustrating a target color range for the output of an LCD image system, a color range of the LED used with the system, and an "uncompensated" color space or area representing the area where the color of the light being output from an LCD component may fall within.

The following description is merely exemplary in nature and is not intended to limit the present disclosure, application, or uses. It should be understood that throughout the drawings, corresponding reference numerals indicate like or corresponding parts and features.

Figure 2:
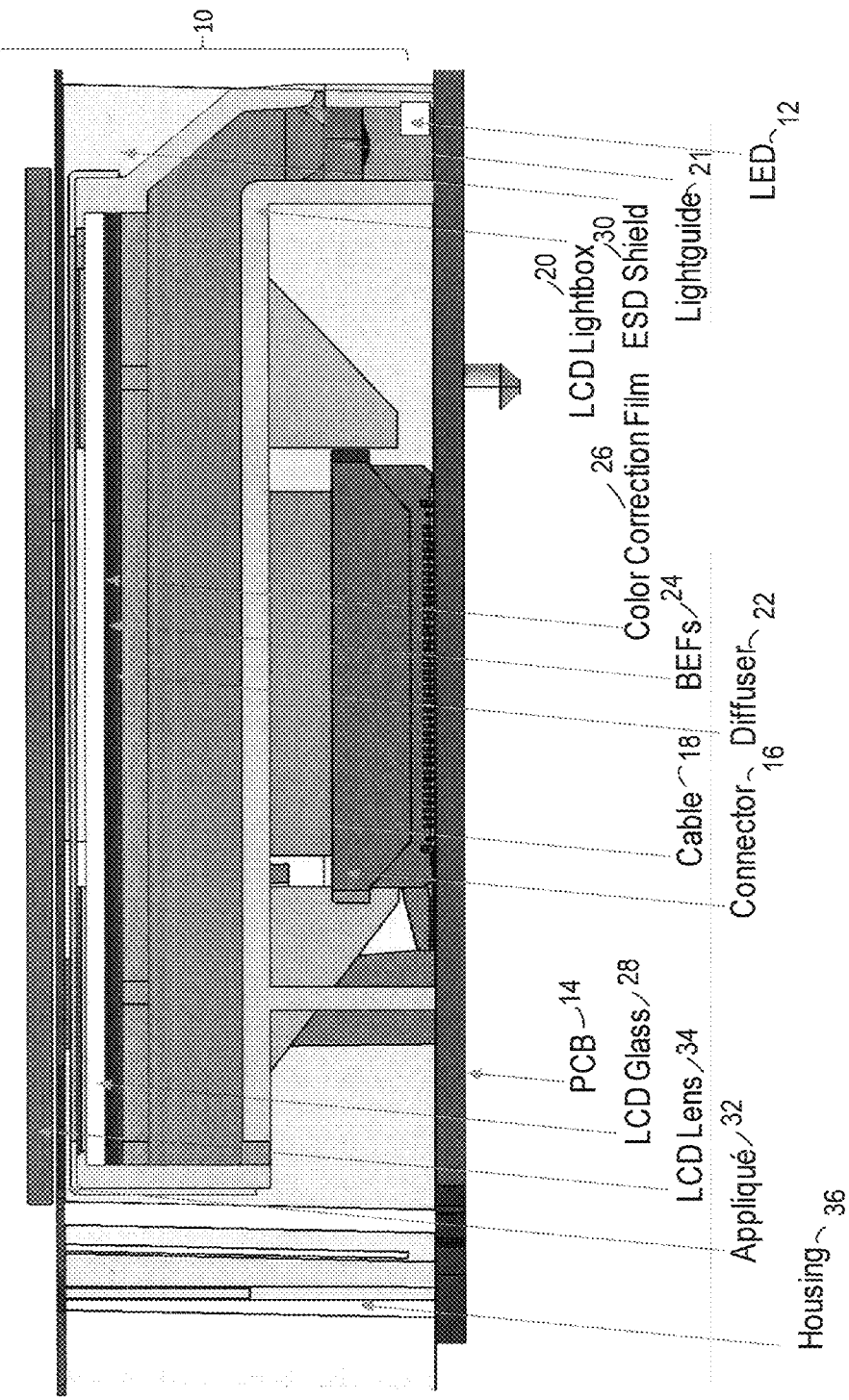
FIG. 2 is a cross sectional side view of a LCD image system in accordance with one embodiment of the present disclosure incorporating a filter to produce a desired color shift to light being emitted from the system.

Referring to FIG. 2, one example of a cross section of a LCD image system 10 in accordance with the present disclosure is shown. The LCD image system 10 is constructed so that a selected one of a plurality of pre-constructed color correction filters can be implemented during assembly of the LCD image system 10, so that a desired color shift to its light output, indicated by arrow "L", can be achieved. The system 10 implements one of the plurality of pre-constructed filters, each forming a color correction film, that is designed to shift the color of light passing through it in accordance with predetermined Cx and Cy values, to account for known potential color shifts caused by other components of the system 10.

The LCD image system 10 in this example may include an LED 12 mounted on a PCB 14, a connector 16, a cable 18, and an LCD light box 20 in communication with the cable 18. The lightbox 20 in this example may include a light guide 21 for channeling the light from the LED 12. The LCD lightbox 20 may also include a diffuser 22, one or more brightness enhancement films (BEFs) 24, and a color correction filter, which in this example is shown as a color correction film 26, which is positioned adjacent the diffuser 22. The LCD lightbox 20 may also include LCD glass component 28 which may be positioned adjacent to the color correction film 26. An ESD (electrostatic discharge) shield 30 may partially or substantially cover the LCD light box 20. An appliqué 32 may be positioned adjacent ESD shield 30, and an LCD lens 34 may be positioned over the LCD light box 20. A suitable housing 36 may be used to house the various above-described components. The entire assembly shown in FIG. 2 may be forms the LCD image system 10.

With the LCD image system 38 shown in FIG. 2, it will be understood that both the LCD glass component 28 and the LED 12 may each produce a color shift from the target color, but the color variation produced by the LCD glass component 28 will typically be larger, and in many instances significantly larger, than the color variation produced by the LED 12. Collectively, both color variations may be addressed by selecting one of a plurality of predetermined color shift filters that will shift the color of light passing through them by predetermined Cx and Cy chromaticity offsets. In one example, the present system and method involves producing four different color correction films that each may be identical or similar in size to color correction film 26, and that each provide predetermined, differing color shifts (i.e., providing different Cx and/or Cy values). The selected color correction film shifts the color of the light being emitted from the LCD lightbox 20. However, it will be appreciated less than four color correction films may be provided, or alternatively greater than four predetermined color correction films may be provided. The number of different color correction films that may be required will ultimately depend on the expected degree of color variation produced by the LCD glass component 28 and the LED 12, as well as the size (i.e., area) of the "target" color range that one wishes the light output from the LCD image system 10 to remain within. A greater range of color variation from the LCD glass component 28, or a smaller target color range, may require more than four different predetermined color correction films. In contrast, a larger target color range or a smaller color variation from the LCD glass component 28 and the LED 12 may require less than four different predetermined color filters to be used to keep the color of the light output from the LCD image system 10 within the target color range.

Figure 2A:
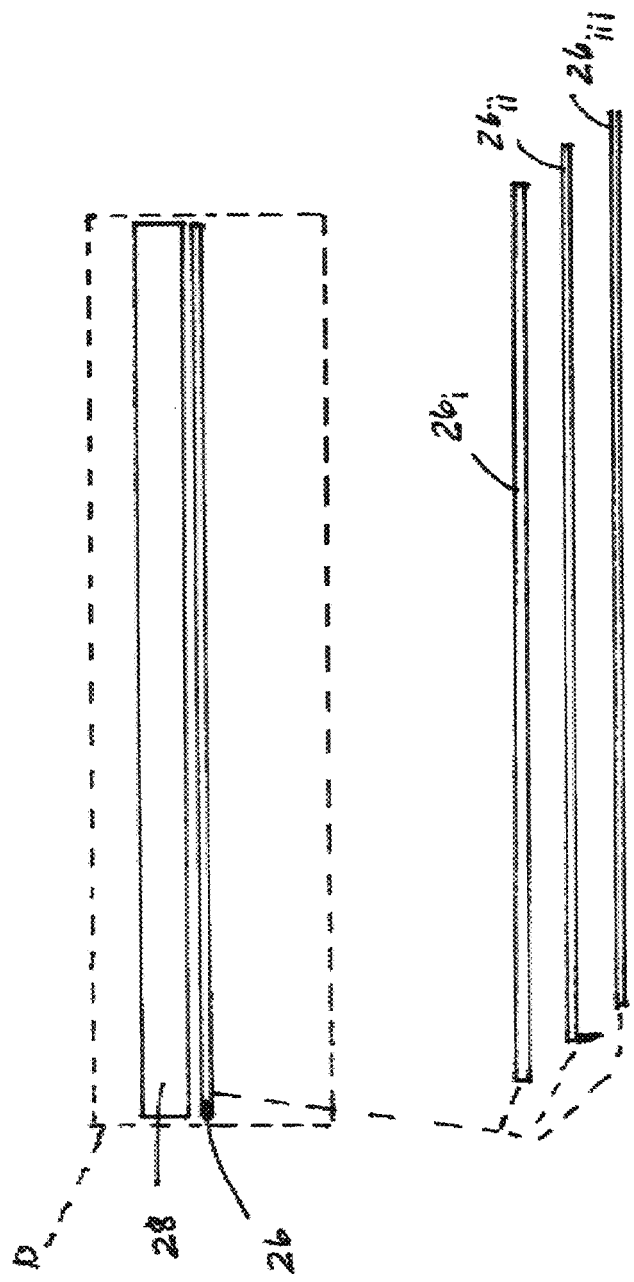
FIG. 2A shows a highly simplified schematic drawing of the LCD image system of claim 1, and illustrating a plurality of color correction films (filters) that may be selected from to impose a desired color correction to the light being output from the system.

Each of the four color correction films 26, $26_i$, $26_{ii}$ and $26_{iii}$ that may be selected from are shown in simplified fashion in FIG. 2A. Each of the color correction films $26_i$, $26_{ii}$ and $26_{iii}$ may be identical in thickness, length and width to the color correction film 26, but all four have different Cx,Cy chromaticity values that will shift the color of light passing through it in different directions (from a chromaticity standpoint). Each of the four color correction films 26, $26_i$, $26_{ii}$ and $26_{iii}$ may be constructed from a suitable material, such as for example polycarbonate (PC) or polymethyl methacrylate (PMMA). The thickness of the four color correction films 26, $26_i$, $26_{ii}$ and $26_{iii}$ may vary but typically may be around 0.5 mm. The length and width dimensions will be selected to enable each of the color correction films 26, $26_i$, $26_{ii}$ and $26_{iii}$ to be placed within the LCD lightbox 20 adjacent the LCD glass component 28 (i.e., either in front of or behind the LCD glass component 28, relative to the direction of the light), and to entirely or at least substantially cover the LCD glass component 28. That is, the films 26, $26_i$, $26_{ii}$ and $26_{iii}$ will each typically be about the same length and width area dimensions as the LCD glass component 28, or possibly just slightly larger). It is also possible that the light guide 21 itself could be constructed with specific Cx,Cy values to accomplish the needed color shifting, and/or that a plurality of light guides 21, each having different Cx,Cy values could be provided that one could select from to implement the needed color shift.

Figure 3:
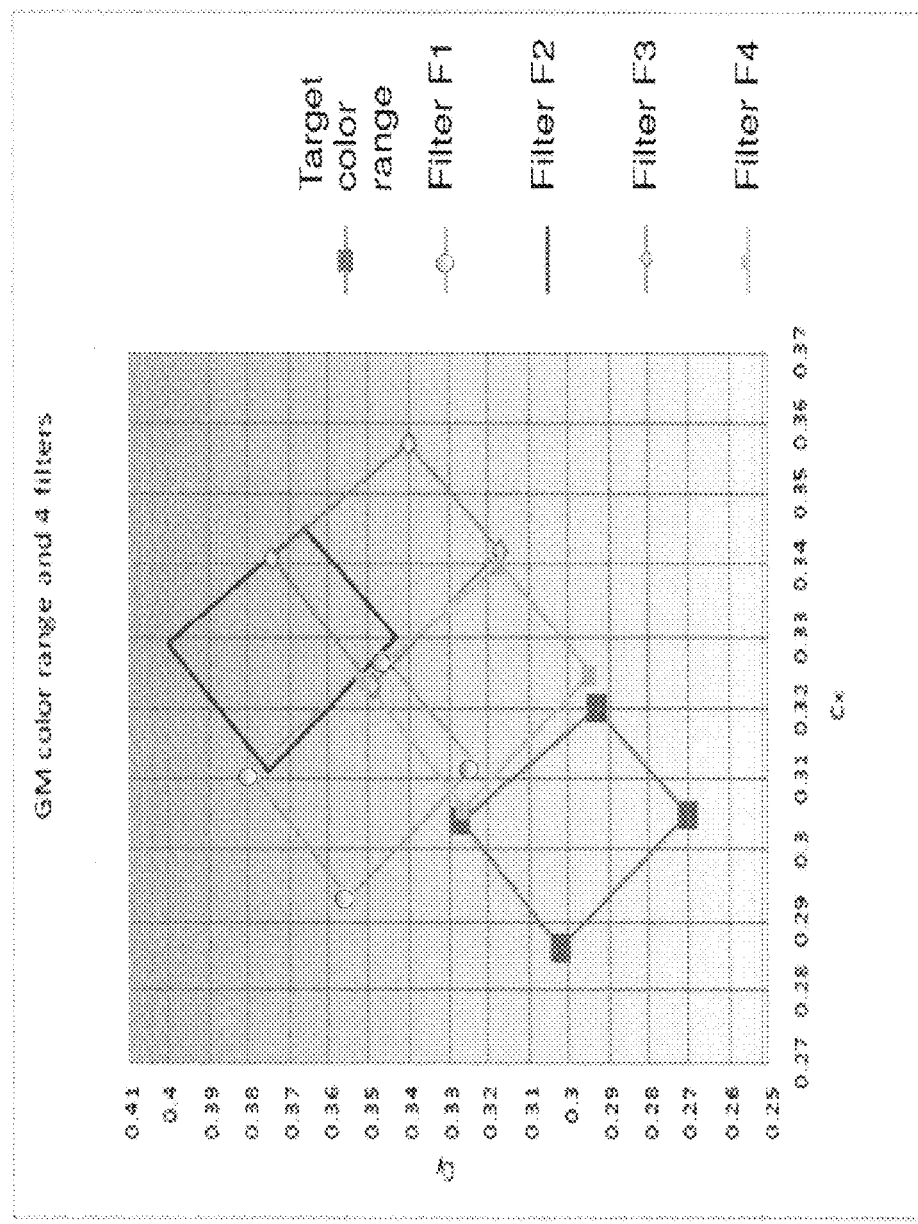
FIG. 3 is a chromaticity graph illustrating the color spaces that the color of the light emitted from the LCD component may fall within before color correction is provided by any one of a plurality of preconstructed color correction films being installed in the LCD image system.

Referring to FIG. 3, each of the four color correction films 26, $26_i$, $26_{ii}$ and $26_{iii}$ will be of a color (i.e., having specific Cx and Cy values) that is designed such that it will shift the color of the light output from the LCD glass component 28 back to within the target area defined by line A in FIG. 1. For example, one may first measure the light output from the LCD image system 10 using a spectrometer, but without including any color correction film over (or under) the LCD lightbox 20. If the measured color output from the LCD lightbox 20 has Cx,Cy values that show the light output as having a color shift that falls within the boundaries of Line F1 in FIG. 3, then a first one of the predetermined color correction films (e.g., film 26 in FIG. 2) may be selected for inclusion in the LCD lightbox 20 during its final assembly. However, if the measured light output indicates a color having Cx,Cy values that fall within the box defined by line F2 in FIG. 3, then a second one of the four predetermined color correction films, such as film $26_i$, may be selected for inclusion in the LCD lightbox 20. Similarly, if the measured light output has Cx,Cy values that fall within the box defined by line F3 in FIG. 3, then a third one of the predetermined color correction films, such as film $26_{ii}$, may be implemented in the LCD lightbox 20. And if the measured light output falls within the box defined by line F4 in FIG. 3, then a fourth one of the color correction films, such as film $26_{iii}$, may be selected for use in the LCD lightbox 20. The collective areas of the four boxes F1-F4 represent the total "uncompensated" area defined by line C in FIG. 3. Put differently, the collective areas of the four boxes defined by lines F1-F4 represent the total area in which the color output from the LCD image system 10, without any of the color correction films 26, $26_i$, $26_{ii}$ and $26_{iii}$ installed, may fall.

In practice, it is anticipated that the manufacturer of the LCD glass 28 may take a measurement of light passing through each LCD glass component 28 that it manufactures, and possibly provide a bar code or other medium on which information can be printed, and which is on the packaging of the LCD glass component 28 or otherwise attached to or associated with it. The bar code or other information medium may indicate the precise color shade (i.e., precise Cx,Cy value) for that specific LCD glass component 28. The precise Cx,Cy value for the LED being used will also be known in advance from color measurements made on the LED. From these two variables, the boundaries of the uncompensated color area (i.e., the box defined by line C in FIG. 1) can be mathematically determined and the specific number of different color correction films, and the precise Cx,Cy value for each film, can be determined. The selected color correction film 26, $26_i$, $26_{ii}$ and $26_{iii}$ may then be placed either on top of or beneath the LCD glass component 28 when the LCD lightbox 20 is being assembled as part of the LCD image system 10.

By determining in advance the total uncompensated color space that the uncorrected light output of an LCD assembly can potentially fall within, and constructing a suitable number of color correction filters that can be selected from to provide the different required degrees of color shifting, the color of the light output from an LCD assembly can be easily corrected. More particularly, the color of the light output can be easily corrected so that it falls within a small, predetermined target color space or area. And the color correction films (such as color correction film 26, $26_i$, $26_{ii}$ and $26_{iii}$) can be easily and quickly assembled into the LCD image system 38 during its manufacture.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for correcting a color of light being generated by an LCD image, during manufacture of the LCD image system, wherein the LCD image system has an LED and an LCD glass component that is illuminated by the LED, the method including:
    identifying a total uncompensated color space representing a total area of potential color variation that is expected from an LCD image system as a result of variations in one or more components used to construct the LCD image system;
    identifying a plurality of distinct color shifts falling within the uncompensated color space that may be caused by the one or more components used to construct the LCD image system, prior to assembling the LCD image system;
    constructing a plurality of color correction filters from a plurality of films such that each one of the plurality of color correction filters has different predetermined Cx and Cy chromaticity values, and further such that each said color correction filter is adapted to provide a predetermined, differing Cx and Cy chromaticity shift to light being output by the LCD glass component when assembled into the LCD image system, to thus nullify each of the distinct color shifts caused by component or manufacturing variations identified prior to the assembly of the LCD image system;
    further constructing each one of the color correction filters to enable a single selected one of the plurality of color correction filters to be placed at least one of adjacent the LED component or adjacent the LCD glass component of the image during assembly of the LCD image system; and
    the plurality of color correction filters being constructed based on known, differing ranges of color variations that may be present in a color of the light being output from the LCD glass component, and further constructed such that the single selected one of the plurality of color correction filters, when placed adjacent at least one of the LED component or adjacent the LCD glass component, provides Cx and Cy chromaticity values that shift the color of the light being output from the LCD glass component from outside a predetermined target color area back into a selected one of a plurality of predetermined color quadrants within a predetermined Cx and Cy chromaticity region, wherein the selected one of the plurality of color quadrants represents the predetermined target color area, to thus nullify a specific one of distinct color shifts that would have existed without use of the single selected one of the color correction filters.

2. The method of claim 1, wherein the film of each of the color correction filters is constructed from one of a polycarbonate (PC) or polymethyl methacrylate (PMMA) material.

3. The method of claim 2, wherein the film of each of the color correction filters has a thickness of about 0.5 mm.

4. The method of claim 1, wherein said constructing a plurality of color correction filters comprises constructing a plurality of at least three different films that each have both a predetermined Cx chromaticity value and a predetermined Cy chromaticity value.

5. The method of claim 1, wherein each one of the plurality of color correction filters is constructed to account for color variations in a light emitted by the LED.

\* \* \* \* \*